(12) United States Patent
Cui et al.

(10) Patent No.: US 11,099,336 B2
(45) Date of Patent: Aug. 24, 2021

(54) OPTICAL FIBER CONNECTOR

(71) Applicant: ACON OPTICS COMMUNICATIONS INC., New Taipei (TW)

(72) Inventors: Yangyang Cui, New Taipei (TW); Yanmei Chang, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 16/845,076

(22) Filed: Apr. 10, 2020

(65) Prior Publication Data
US 2020/0326489 A1 Oct. 15, 2020

(30) Foreign Application Priority Data
Apr. 11, 2019 (CN) .......................... 201920485636.8

(51) Int. Cl.
*G02B 6/36* (2006.01)
*G02B 6/38* (2006.01)
*G02B 6/42* (2006.01)

(52) U.S. Cl.
CPC ......... *G02B 6/3893* (2013.01); *G02B 6/3825* (2013.01); *G02B 6/3879* (2013.01); *G02B 6/4261* (2013.01)

(58) Field of Classification Search
CPC .. G02B 6/3893; G02B 6/3825; G02B 6/3879; G02B 6/4261; G02B 6/3897
See application file for complete search history.

(56) References Cited

U.S. PATENT DOCUMENTS

| 10,185,099 | B2 | 1/2019 | Chang et al. | |
|---|---|---|---|---|
| 2003/0063862 | A1* | 4/2003 | Fillion | G02B 6/3825 385/53 |
| 2015/0212283 | A1 | 7/2015 | Jiang et al. | |
| 2016/0306125 | A1* | 10/2016 | Wu | G02B 6/3887 |
| 2017/0299818 | A1* | 10/2017 | Chang | G02B 6/3871 |

OTHER PUBLICATIONS

"Search Report of Europe Counterpart Application", dated Jul. 27, 2020, p. 1-p. 8.

* cited by examiner

*Primary Examiner* — Ellen E Kim
(74) *Attorney, Agent, or Firm* — JCIPRNET

(57) ABSTRACT

An optical fiber connector includes a connector housing module, a fastener, a linkage member, and a pull handle. The connector housing module includes at least one clip arm, and the connector housing module is adapted to be inserted into a target object and buckled to the target object by the clip arm. The fastener buckles the connector housing module. The linkage member is pivotally connected to the fastener and movably abuts against the clip arm. The pull handle movably passes between the fastener and the linkage member to be connected to the linkage member. When the connector housing module is inserted into the target object, the pull handle is adapted to be forced to drive the linkage member to pivot relative to the fastener and press against the clip arm, so as to remove a buckling state between the clip arm and the target object and pull the connector housing module out of the target object.

6 Claims, 5 Drawing Sheets

OPTICAL FIBER CONNECTOR

CROSS-REFERENCE TO RELATED APPLICATION

This application claims the priority benefit of China application serial no. 201920485636.8, filed on Apr. 11, 2019. The entirety of the above-mentioned patent application is hereby incorporated by reference herein and made a part of this specification.

BACKGROUND

Technical Field

The disclosure relates to a connector, and in particular, to an optical fiber connector.

Description of Related Art

An optical fiber is an optical transmission tool. To enable the optical fiber to be connected to various electronic devices and enable information transmitted by the optical fiber to be used by the electronic devices, connectors have to be used as a medium between the optical fiber and the electronic devices to achieve the purpose of connection.

Taking an existing LC (Lucent Connector) optical fiber connector as an example, it cannot be easily held due to its small size, thus causing problems to users during disassembly. When the optical fiber connector is applied to a high-density connection environment, such as a high-density server case, because components in the case are all configured compactly, obstacles are formed in the periphery of the optical fiber connector, thus hindering its disassembly path and deepening the users' difficulty in disassembly.

Therefore, how to use simple components to address the problem that the optical fiber connector cannot be easily disassembled in the above operating environment really needs to be considered by a person skilled in the art.

SUMMARY

The disclosure is directed to an optical fiber connector, which, by means of a pull handle and a linkage mechanism, enables users to easily remove a buckling state of a connector housing module for separation.

The optical fiber connector of the disclosure includes a connector housing module, a fastener, a linkage member, and a pull handle. The connector housing module includes at least one clip arm, and the connector housing module is adapted to be inserted into a target object and buckled to the target object by the clip arm. The fastener buckles the connector housing module. The linkage member is pivotally connected to the fastener and movably abuts against the clip arm. The pull handle movably passes between the fastener and the linkage member to be connected to the linkage member. When the connector housing module is inserted into the target object, the pull handle is adapted to be forced to drive the linkage member to pivot relative to the fastener and press against the clip arm, so as to remove a buckling state between the clip arm and the target object and pull the connector housing module out of the target object.

In an embodiment of the disclosure, a connection structure of the fastener and the connector housing module, a connection structure of the linkage member and the fastener, and a connection structure of the pull handle and the linkage member are all detachable connection structures.

In an embodiment of the disclosure, the connector housing module includes at least one connector, and the fastener includes at least one channel for the at least one connector to pass through.

In an embodiment of the disclosure, the channel has an open contour.

In an embodiment of the disclosure, the connector includes a first body, the fastener buckles the first body from a top side downwards to make the first body pass through the channel, and the clip arm extends on the top side.

In an embodiment of the disclosure, the fastener buckles the connector housing module from a top side downwards, the clip arm extends on the top side, the linkage member is pivotally connected to the fastener on the top side and abuts against the clip arm, and the pull handle is connected to the linkage member on the top side.

In an embodiment of the disclosure, the fastener further includes a limiting portion on the top side, and the pull handle passes between the linkage member and the fastener and then passes through the limiting portion to buckle the linkage member.

In an embodiment of the disclosure, the pull handle is flexible. After the pull handle passes between the linkage member and the fastener and through the limiting portion, the pull handle deformably forms a bend which extends away from the fastener until buckling the linkage member.

In an embodiment of the disclosure, a curvature of the bend changes as the pull handle is pulled under a force.

In an embodiment of the disclosure, the linkage member includes a second body, a pivot shaft, and a pressing portion. The pivot shaft and the pressing portion are located on two opposite sides of the second body. The fastener further includes a pivot connection portion located on the top side, the pivot shaft is pivotally connected to the pivot connection portion, and the pressing portion abuts against the clip arm. When the clip arm is pressed by the linkage member to remove the buckling state, a pivoting direction of the second body is opposite to a pressed direction of the clip arm.

Based on the above, in an optical fiber connector, a connector housing module is provided with a fastener, a linkage member, and a pull handle, where the linkage member abuts against at least one clip arm of the connector housing module, the linkage member is pivotally connected to the fastener, and the pull handle is connected to the linkage member. Accordingly, when the pull handle is forced to move, it drives the linkage member to pivot relative to the fastener, so that the linkage member can press against the clip arm to successfully remove a buckling state between the clip arm and a target object. Meanwhile, the forced pull handle may also pull the connector housing module out of the target object and complete an action of separating the connector housing module from the target object.

Accordingly, a simple driving and linkage mechanism formed by the pull handle, the fastener, and the linkage member enables the users to unlock and pull out the connector housing module by applying a force in a single direction, which effectively overcomes the high-density environment of the optical fiber connector with a simple structure and actions, and thus improves the operation convenience of the optical fiber connector.

In order to make the aforementioned and other objectives and advantages of the disclosure comprehensible, embodiments accompanied with figures are described in detail below.

DESCRIPTION OF THE EMBODIMENTS

Figure 1:
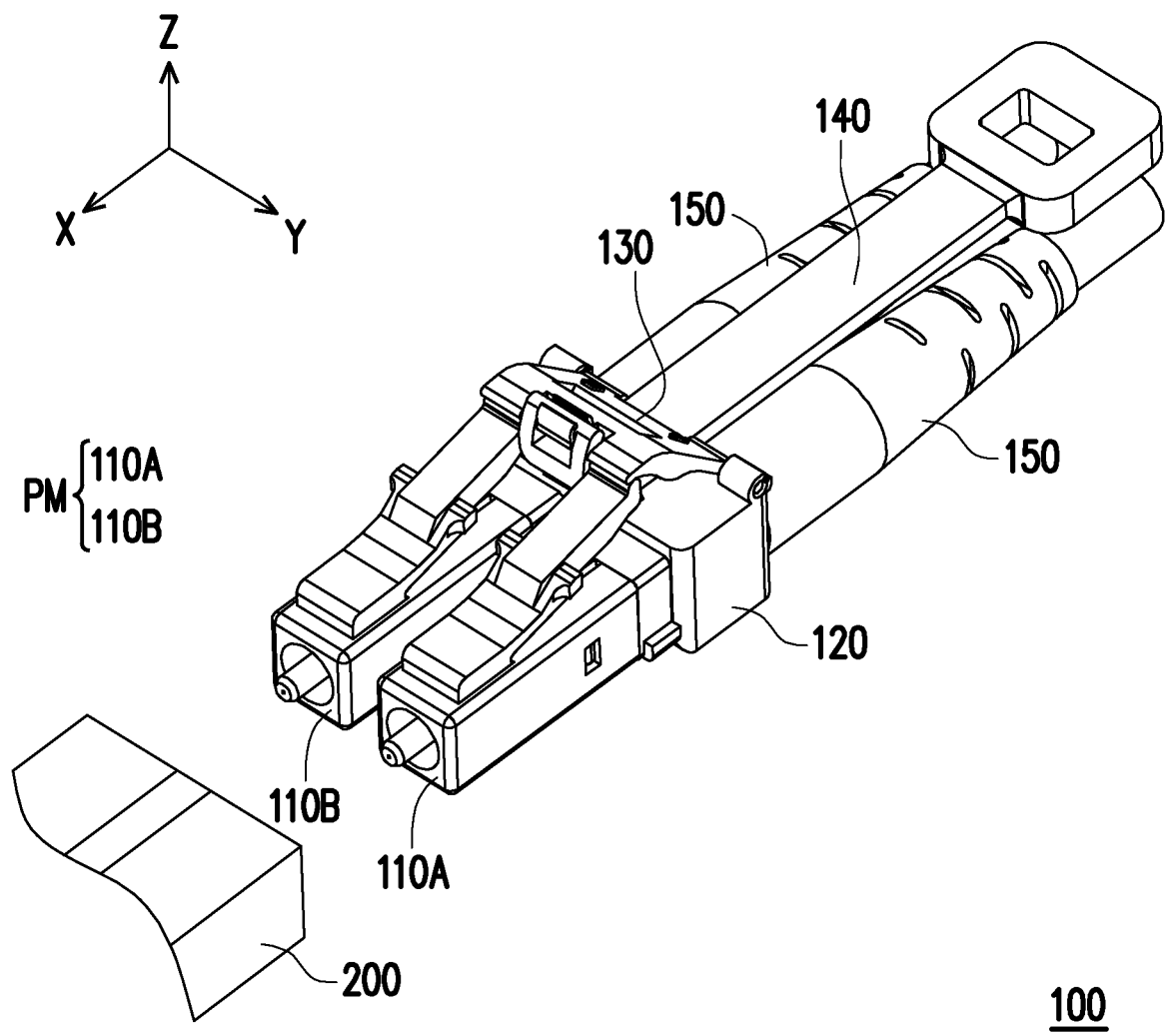
FIG. 1 is a schematic view of an optical fiber connector according to an embodiment of the disclosure.
Figure 2:
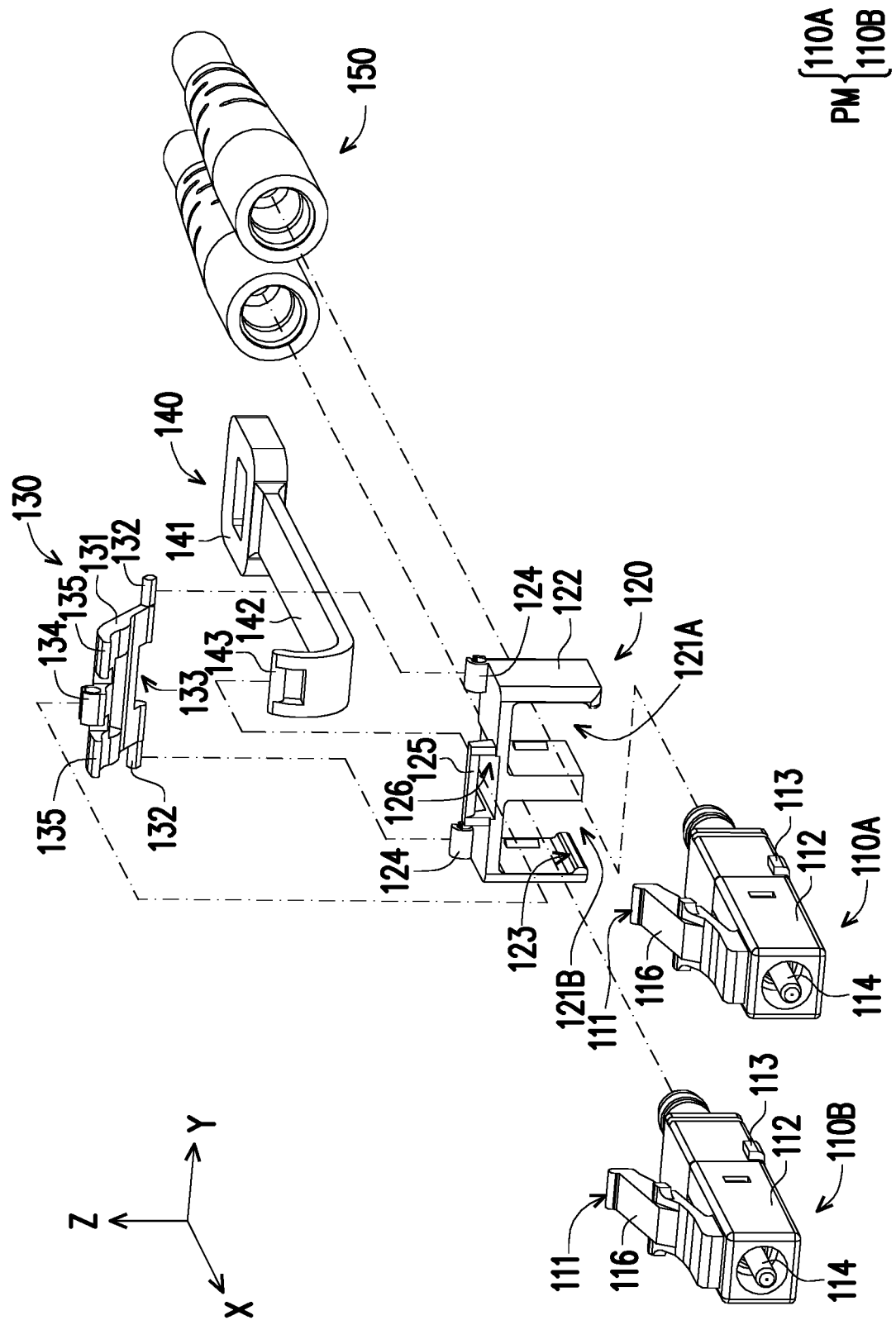
FIG. 2 and FIG. 3 are exploded views of an optical fiber connector from different perspectives.
Figure 3:
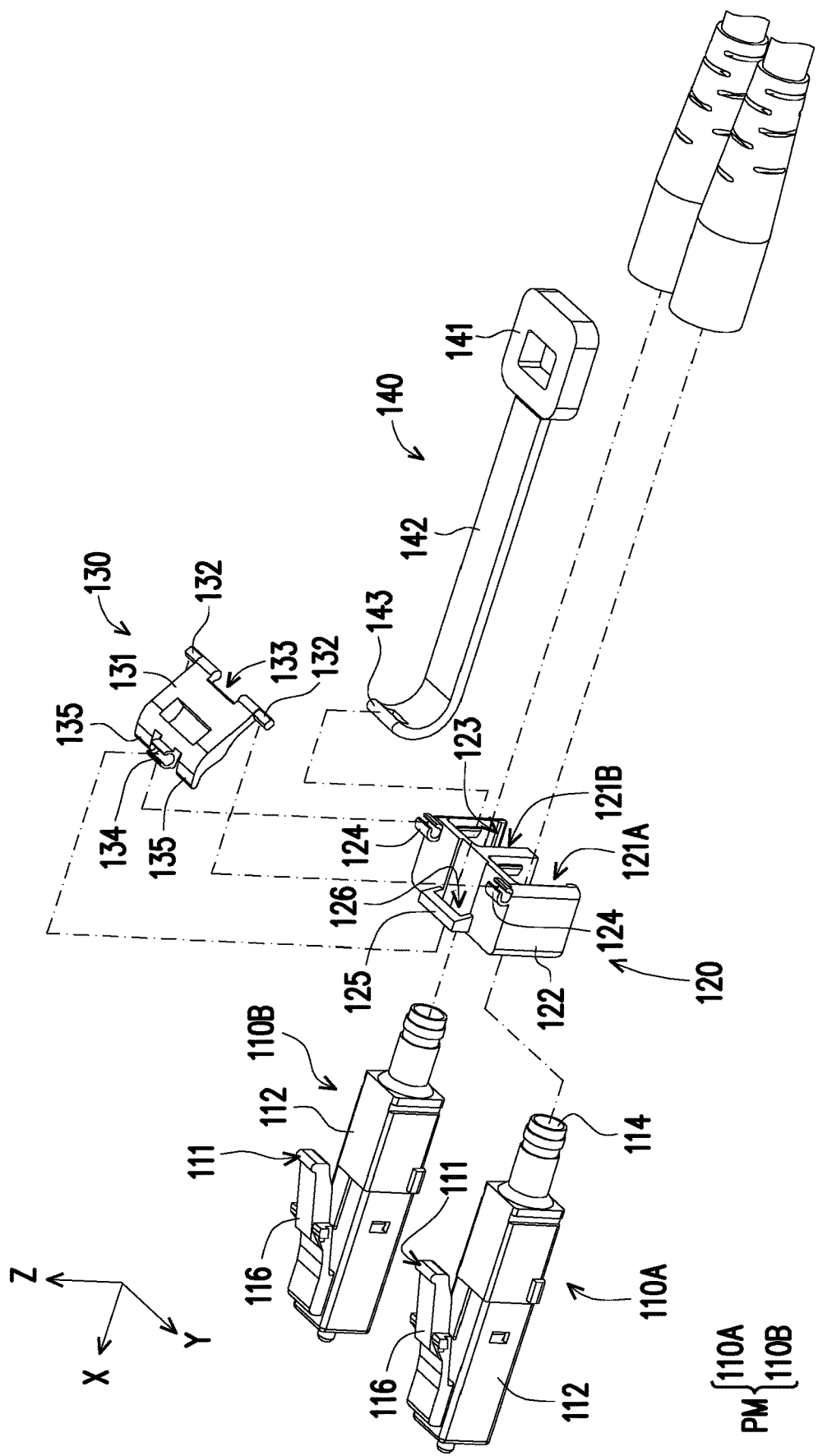

FIG. 1 is a schematic view of an optical fiber connector according to an embodiment of the disclosure. FIG. 2 and FIG. 3 are exploded views of an optical fiber connector from different perspectives. Referring to FIG. 1 to FIG. 3 together, in the present embodiment, an optical fiber connector 100 is, for example, an LC optical fiber connector, including a connector housing module PM, a fastener 120, a linkage member 130, a pull handle 140, and a cable module 150. Herein, the connector housing module PM is formed by two connectors 110A and 110B and adapted to butt a corresponding target object 200 mutually, and the connector housing module PM includes at least one clip arm (as shown in the present embodiment, the connectors 110A and 110B each include a clip arm 116). The connector housing module PM is adapted to be inserted into the target object 200 and buckle the target object 200 (not shown) by the clip arm 116 to maintain the stability during signal transmission. In the present embodiment, the target object 200 may be another connector housing module or adapter.

It should be noted that the number of the connectors is not limited in the disclosure. Meanwhile, structural characteristics and associated plug and pull actions of the LC optical fiber connector can be known from the prior art, and thus those unrelated to the disclosure are not detailed. Moreover, rectangular coordinates X-Y-Z are also used as a basis for describing components in the disclosure. By taking a Z axis as an example, a positive Z-axis direction is described as above, upward or a top side in the present embodiment, while a negative Z-axis direction is described as below, downward or a bottom side in the present embodiment, to serve as clear descriptions of relative positions and corresponding relationships of the components.

In the present embodiment, the connectors 110A and 110B include the same component composition, respectively including a first body 112, an optical fiber 114 disposed in the first body 112, a protruding portion 113 disposed aside the first body 112, and a clip arm 116 disposed on a top side of the first body 112. The clip arm 116 extends towards the negative X-axis direction and the positive Z-axis direction on the top side.

In the present embodiment, the fastener 120 is an integral gate structure, including a third body 122, a pair of channels 121A and 121B, a buckling portion 123 located in the channels 121A and 121B, and a pivot connection portion 124 and a limiting portion 125 located on the top side, where the fastener 120 buckles the connectors 110A and 110B from the top side of the optical fiber connector 100 downwards. Therefore, the channels 121A and 121B of the fastener 120 in the present embodiment facilitate the connectors 110A and 110B to correspondingly pass to be connected to the cable module 150, and the channels 121A and 121B each have an open contour facing downwards. It can be clearly known from the schematic assembly in FIG. 2 and FIG. 3 that the open contour facilitates the fastener 120 to buckle the first bodies 112 of the connectors 110A and 110B by the buckling portion 123 near the opening, and meanwhile, the third body 122 of the fastener 120 further abuts against the protruding portion 113 located aside the first body 112. Accordingly, the connectors 110A and 110B are integrated by the fastener 120 and may be considered as a single component. Herein, a connection structure of the fastener 120 and the connector housing module PM forms a detachable connection structure due to the open contour. The detachable connection structure means that the users can complete the disassembly of the components without using an additional tool and without damaging the structure. This facilitates the users to replace the connectors 110A and 110B according to their needs. For example, positions of the connectors 110A and 110B with different polarity have to be changed according to states of another connector housing module or adapter, which can be easily disassembled and simplified due to the fastener 120.

As described above, the number of the connectors is not limited in the disclosure, this indicates that the number of channels of the fastener may also change correspondingly with the number of the connectors. In other embodiments not shown, the optical fiber connector may include only a single channel of the fastener corresponding to a single connector. The optical fiber connector may also include a plurality of side-by-side connectors, and the fastener also includes a plurality of channels corresponding to each other and side by side.

In the present embodiment, the linkage member 130 includes a second body 131, a pair of pivot shafts 132, a buckling portion 134, and pressing portions 135 located on two opposite sides of the buckling portion 134. The pivot shafts 132 are pivotally connected to the pivot connection portion 124 of the fastener 120 by detachable buckling, and thus the linkage member 130 can pivot around the Y axis relative to the fastener 120. The pressing portions 135 and the buckling portion 134 are located on a same side of the second body 131 and opposite the pivot shafts 132. When the linkage member 130 pivots, the pressing portions 135 and the buckling portion 134 may be regarded as movable free ends. It should also be mentioned that the pressing portions 135 correspond to and are movably joined on (abut against) ends 111 of the clip arms 116 of the connectors 110A and 110B.

Moreover, the pull handle 140 movably passes between the fastener 120 and the linkage member 130 on the top side to be connected to the linkage member 130. In detail, the linkage member 130 further includes a notch 133 located on a bottom side of the second body 131 to form an opening between the notch 133 and the fastener 120 when the linkage member 130 is pivotally connected to the fastener 120. Meanwhile, the fastener 120 further includes a limiting portion 125 on the top side, which may also form another opening with the third body 122. The pull handle 140 includes a gripping portion 141, a strip portion 142, and a buckling portion 143, where the strip portion 142 extends from the gripping portion 141 and is flexible. Therefore, as in the schematic assembly in FIG. 2 and FIG. 3, the strip portion 142 movably passes the opening formed between the notch 133 and the fastener 120 and the another opening formed by the limiting portion 125 and the third body 122 in sequence, that is, after the strip portion 142 moves through a channel 126 substantially located on a top side of the third body 122, the buckling portion 143 (e.g., a buckling rod) on one end of the strip portion 142 may buckle the buckling portion 134 (e.g., a buckling slot) of the linkage member 130 and cause a part of the strip portion 142 passing through the limiting portion 125 to form a bend. In other words, after the pull handle 140 passes between the linkage member 130 and the fastener 120 and through the limiting portion 125, the pull handle 140 deformably forms a bend which extends away from the fastener 120 until buckling the linkage member 130.

It should be noted that a detachable connection structure is formed between the pivot shaft 132 of the linkage member 130 and the pivot connection portion 124 of the fastener 120, and a detachable connection structure is also formed between the buckling portion 143 of the pull handle 140 and the buckling portion 134 of the linkage member 130. In other words, in addition to the fastener 120 and the connector housing module PM, an effect of facilitating the users to disassemble may also be achieved between the fastener 120 and the linkage member 130 and between the pull handle 140 and the linkage member 130 by means of a detachable connection structure.

Based on the collocational settings of the pull handle 140, the fastener 120, the linkage member 130, and the clip arm 116, the components may generate linkage relations. That is, when a user applies a force to pull the pull handle 140, it drives the linkage member 130 to pivot relative to the fastener 120, and meanwhile, press against the clip arm 116, so as to facilitate the provision of an unlocking effect for the clip arm 116.

Figure 4:
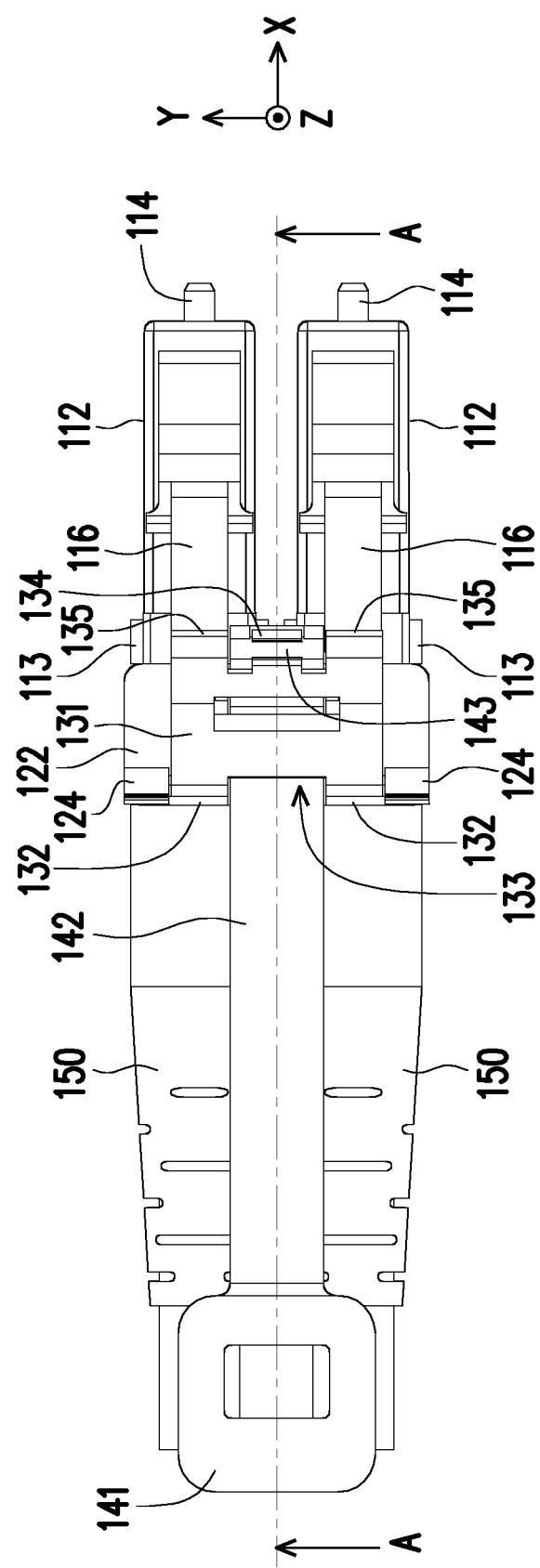
FIG. 4 is a top view of an optical fiber connector.
Figure 5:
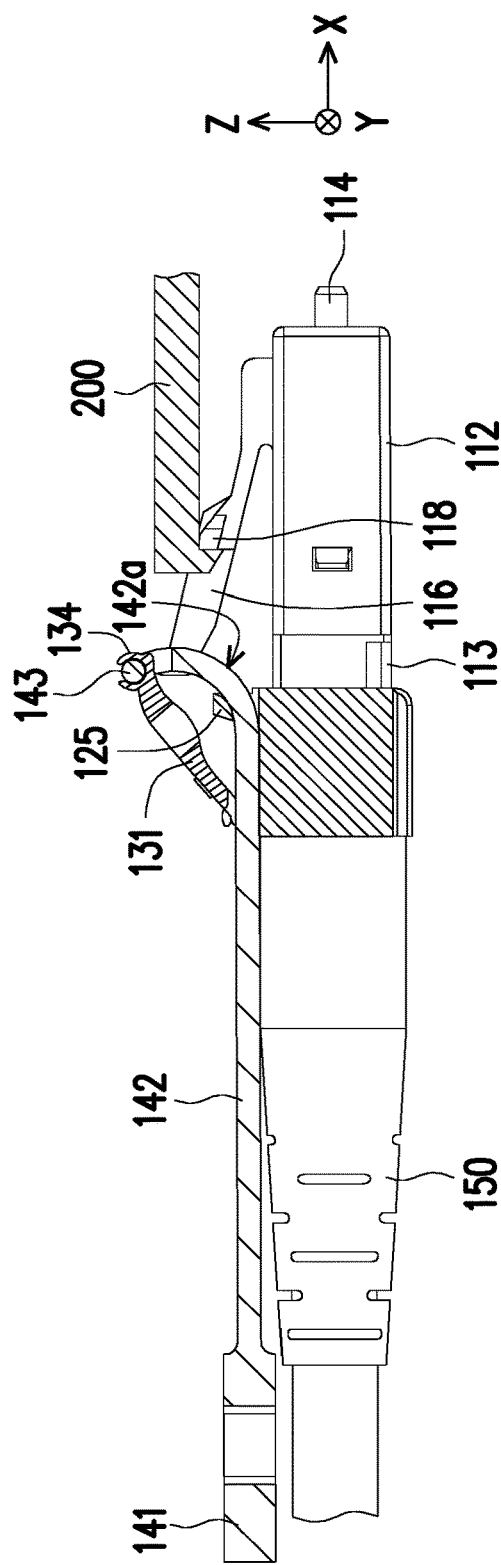
FIG. 5 is a partial cross-sectional view of the optical fiber connector in FIG. 4.
Figure 6:
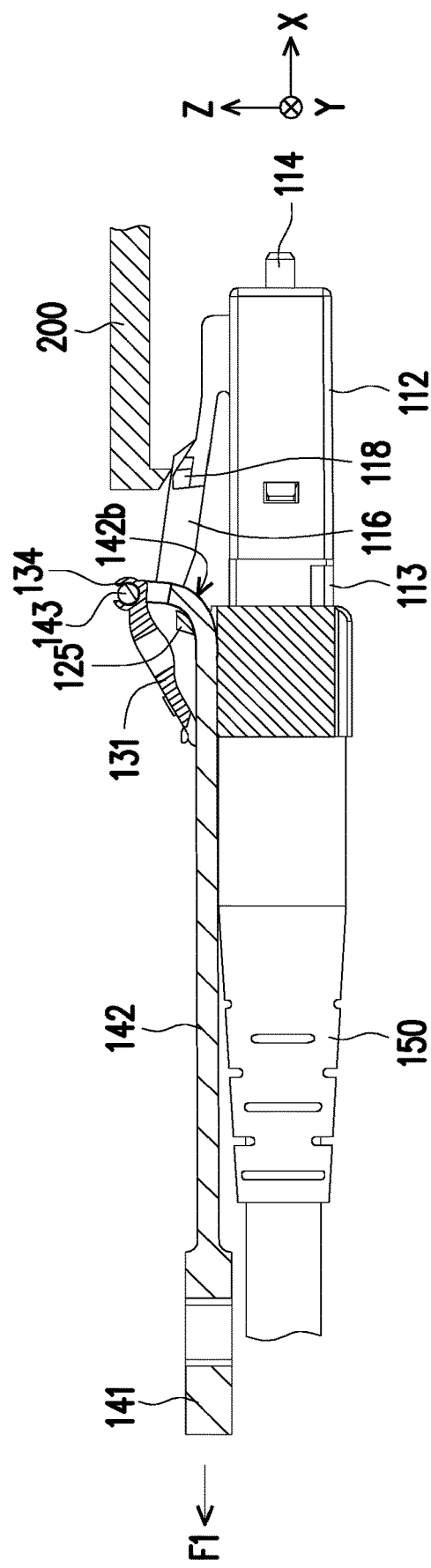
FIG. 6 is a schematic view of another state of the optical fiber connector in FIG. 5.

FIG. 4 is a top view of an optical fiber connector. FIG. 5 is a partial cross-sectional view of the optical fiber connector in FIG. 4, which is illustrated along a profile A-A of FIG. 4. FIG. 6 is a schematic view of another state of the optical fiber connector in FIG. 5. Referring to FIG. 4 to FIG. 6 together, specifically, FIG. 4 and FIG. 5 are simple schematic views showing that the optical fiber connector 100 is inserted into and buckled to the target object 200, that is, when the optical fiber connector 100 is inserted into the target object 200, a buckling portion 118 on the clip arm 116 generates a buckling relation with the target object 200. Next, as shown in FIG. 6, the user may hold the gripping portion 141 of the pull handle 140 to apply a force F1 to pull the pull handle 140 towards the negative X-axis direction, such that the strip portion 142 can drive the second body 131 of the linkage member 130 to rotate clockwise around the Y axis. Thus, the linkage member 130 presses against the clip arms 116 of the connectors 110A and 110B and causes them to rotate anticlockwise around the Y axis opposite to the rotation direction of the linkage member 130 until the buckling portion 118 moves away from the target object 200 towards the negative X-axis direction (as shown in FIG. 6). In this case, the buckling relation between the clip arm 116 and the target object 200 is removed, and the optical fiber connector 100 can be successfully pulled out of the target object 200 upon application of the force F1.

In addition, by comparing FIG. 5 with FIG. 6, with the limiting effect provided by the limiting portion 125 of the fastener 120, a partial bend of the strip portion 142 of the pull handle 140 connected to the linkage member 130 varies as the user pulls the pull handle 140, and it can be known from a bend 142a shown in FIG. 5 and a bend 142b shown in FIG. 6 that its curvature varies with whether the pull handle is pulled (whether the force F1 is applied).

Based on the above, in the above embodiment of the disclosure, in an optical fiber connector, a connector housing module is provided with a fastener, a linkage member, and a pull handle, where the linkage member abuts against at least one clip arm of the connector housing module, the linkage member is pivotally connected to the fastener, and the pull handle is connected to the linkage member. Accordingly, when the pull handle is forced to move, it drives the linkage member to pivot relative to the fastener, so that the linkage member can press against the clip arm to successfully remove a buckling state between the clip arm and a target object. Meanwhile, the forced pull handle may also pull the connector housing module out of the target object and complete an action of separating the connector housing module from the target object.

Accordingly, a simple driving and linkage mechanism formed by the pull handle which is flexible, the fastener, and the linkage member enables the users to unlock and pull out the connector housing module by applying a force in a single direction, which can effectively overcome the high-density environment of the optical fiber connector with a simple structure and actions regardless of surrounding obstacles caused by the high-density environment, and thus improve the operation convenience of the optical fiber connector.

Besides, the fastener and the connector housing module, the linkage member and the fastener, as well as the pull handle and the linkage member are all connected by detachable structures; this makes the optical fiber connector easy to disassemble, so that the components can be disassembled and replaced according to usage requirements.

Although the disclosure has been described above with embodiments, they are not intended to limit the disclosure. Any person of ordinary skill in the art can make some changes and modifications without departing from the spirit and scope of the disclosure. Thus, the protection scope of the disclosure should be subject to the scope defined by the appended claims.

What is claimed is:

1. An optical fiber connector comprising:
   a connector housing module comprising at least one clip arm, the connector housing module being adapted to be inserted into a target object and buckled to the target object by the clip arm;
   a fastener buckling the connector housing module;
   a linkage member pivotally connected to the fastener and movably abutting against the clip arm; and
   a pull handle movably passing between the fastener and the linkage member to be connected to the linkage member, wherein when the connector housing module is inserted into the target object, the pull handle is adapted to be forced to drive the linkage member to pivot relative to the fastener and press against the clip arm, so as to remove a buckling state between the clip arm and the target object and pull the connector housing module out of the target object,
   wherein the fastener buckles the connector housing module from a top side downwards, the clip arm extends on the top side, the linkage member is pivotally connected to the fastener on the top side and abuts against the clip arm, and the pull handle is connected to the linkage member on the top side,
   the fastener further comprises a limiting portion on the top side, and the pull handle passes between the linkage member and the fastener and then passes through the limiting portion to buckle the linkage member,
   the pull handle is flexible, and after the pull handle passes between the linkage member and the fastener and through the limiting portion, the pull handle deformably forms a bend which extends away from the fastener until buckling the linkage member,
   a curvature of the bend changes as the pull handle is pulled under a force.

2. The optical fiber connector according to claim 1, wherein a connection structure of the fastener and the connector housing module, a connection structure of the linkage member and the fastener, and a connection structure of the pull handle and the linkage member are all detachable connection structures.

3. The optical fiber connector according to claim 1, wherein the connector housing module comprises at least one connector, and the fastener comprises at least one channel for the at least one connector to pass through.

4. The optical fiber connector according to claim 3, wherein the channel has an open contour.

5. The optical fiber connector according to claim 3, wherein the connector comprises a first body, the fastener buckles the first body from a top side downwards to make the first body pass through the channel, and the clip arm extends on the top side.

6. The optical fiber connector according to claim 1, wherein the linkage member comprises a second body, a pivot shaft, and a pressing portion, the pivot shaft and the pressing portion are located on two opposite sides of the second body, the fastener further comprises a pivot connection portion located on the top side, the pivot shaft is pivotally connected to the pivot connection portion, the pressing portion abuts against the clip arm, and when the clip arm is pressed by the linkage member to remove the buckling state, a pivoting direction of the second body is opposite to a pressed direction of the clip arm.

* * * * *